(12) United States Patent
Murakami

(10) Patent No.: US 7,913,823 B2
(45) Date of Patent: Mar. 29, 2011

(54) HYDRAULIC SHOCK ABSORBER

(75) Inventor: Yosuke Murakami, Fukuoi (JP)

(73) Assignee: Showa Corporation, Saitama (JP)

( * ) Notice: Subject to any disclaimer, the term of this patent is extended or adjusted under 35 U.S.C. 154(b) by 719 days.

(21) Appl. No.: 11/953,172

(22) Filed: Dec. 10, 2007

(65) Prior Publication Data

US 2009/0001637 A1 Jan. 1, 2009

(30) Foreign Application Priority Data

Jun. 27, 2007 (JP) ................................. 2007-169455

(51) Int. Cl.
*F16F 9/06* (2006.01)

(52) U.S. Cl. ..... 188/314; 188/297; 188/318; 267/64.26; 267/225

(58) Field of Classification Search ................. 188/297, 188/313, 314, 316, 317, 318, 319.1, 319.2; 267/64.11, 64.13, 64.15, 64.25, 64.26, 195, 267/217, 221, 225, 226; 280/275, 276, 277, 280/283, 284

See application file for complete search history.

(56) References Cited

U.S. PATENT DOCUMENTS

| | | | | |
|---|---|---|---|---|
| 1,918,698 A | * | 7/1933 | Gruss | 267/64.26 |
| 2,713,401 A | * | 7/1955 | Serste et al. | 188/316 |
| 6,328,291 B1 | * | 12/2001 | Marzocchi et al. | 267/64.15 |
| 7,296,812 B2 | * | 11/2007 | Fujita et al. | 267/64.15 |
| 7,377,372 B2 | * | 5/2008 | Wallen | 188/314 |
| 7,565,956 B2 | * | 7/2009 | Lee et al. | 188/319.1 |

FOREIGN PATENT DOCUMENTS

| | | | |
|---|---|---|---|
| DE | 3438163 A1 | * | 4/1986 |
| FR | 2679306 A1 | * | 1/1993 |
| JP | SHO 56-82680 | | 7/1981 |
| JP | 57076339 A | * | 5/1982 |
| JP | 57083744 A | * | 5/1982 |
| JP | 08326820 A | * | 12/1996 |

\* cited by examiner

*Primary Examiner* — Thomas J Williams
(74) *Attorney, Agent, or Firm* — Babcock IP, PLLC

(57) ABSTRACT

In a front fork in which a partition wall member is provided in an inner periphery of an inner tube, a working fluid chamber is comparted under the partition wall member and an oil reservoir chamber is comparted over the partition wall member, a main suspension spring is interposed between an upper spring bearing in a piston rod side attached to an outer tube side and a lower spring bearing in a bottom portion side of the inner tube, within the working fluid chamber of the inner tube, and a sub suspension spring is interposed between an upper spring bearing in an upper end portion side of the outer tube side and a lower spring bearing in the partition wall member provided in an inner periphery of the inner tube, within the oil reservoir chamber of the inner tube.

4 Claims, 4 Drawing Sheets

US 7,913,823 B2

HYDRAULIC SHOCK ABSORBER

BACKGROUND OF THE INVENTION

1. Field of the Invention

The present invention relates to a hydraulic shock absorber for a vehicle. The hydraulic shock absorber according to the invention having significant, tuning and maintenance efficiencies.

2. Description of the Related Art

As a hydraulic shock absorber, as described in Japanese Patent Application Laid-Open (JP-A) No. 56-82680 (patent document 1), there is a structure in which an inner tube in an axle side is slidably inserted into an outer tube in a vehicle body side, a partition wall member is provided in an inner periphery of the inner tube, a working fluid chamber is comparted under the partition wall member, an oil reservoir chamber is comparted over the partition wall member, a piston supporting member attached to the outer tube side is inserted into the working fluid chamber through the partition wall member, and a piston sliding within the working fluid chamber is provided in a leading end portion of the piston supporting member. In this hydraulic shock absorber, a main suspension spring is interposed between an upper spring bearing in the piston supporting member side attached to the outer tube side and a lower spring bearing in a bottom portion, side of the inner tube, within the working fluid chamber of the inner tube.

The following disadvantages exist in the hydraulic shock absorber described in the patent document 1.

(1) To change a spring constant of the suspension spring, it is necessary to detach a partition wall member provided in an upper end portion of the inner tube and draw off the piston supporting member from the working fluid chamber in the inner tube in addition to detaching a cap from an upper end portion of the outer tube, in order to replace the suspension spring. Accordingly, many man hours are required.

(2) If the suspension spring is soaked into the working fluid chamber of the inner tube during replacement of the suspension spring; an oil amount is largely reduced in the working fluid chamber, because a coil diameter and a wire diameter of the suspension spring are thick and a surface area thereof is large. Accordingly, it is necessary to adjust the oil amount each time when the spring is replaced.

(3) If the suspension spring inserted to the working fluid chamber of the inner tube is replaced, an oil flow path flowing through a space between coils of the suspension spring is changed in an inner portion of the working fluid chamber, and a change of a damping force characteristic is generated.

SUMMARY OF THE INVENTION

An object of the present invention is to simplify spring replacement so as to suppress a change of a damping force characteristic on the basis of the spring replacement, in a hydraulic shock absorber.

The present invention relates to a hydraulic shock absorber in which an inner tube in an axle side is slidably inserted into an outer tube in a vehicle body side, a partition wall member is provided in an inner periphery of the inner tube, a working fluid chamber is comparted under the partition wall member, an oil reservoir chamber is comparted over the partition wall member, a piston support member attached to the outer tube side is inserted into the working fluid chamber through the partition wall member, and a piston sliding within the working fluid chamber is provided in a leading end portion of the piston support member. A main suspension spring is interposed between an upper spring bearing in the piston support member side attached to the outer tube side and a lower spring bearing in a bottom portion side of the inner tube, within the working fluid chamber of the inner tube. A sub suspension spring is interposed between an upper spring bearing on an upper end portion side of the outer tube side and a lower spring bearing on the partition wall member side provided in an inner periphery of the inner tube, within the oil reservoir chamber of the inner tube.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
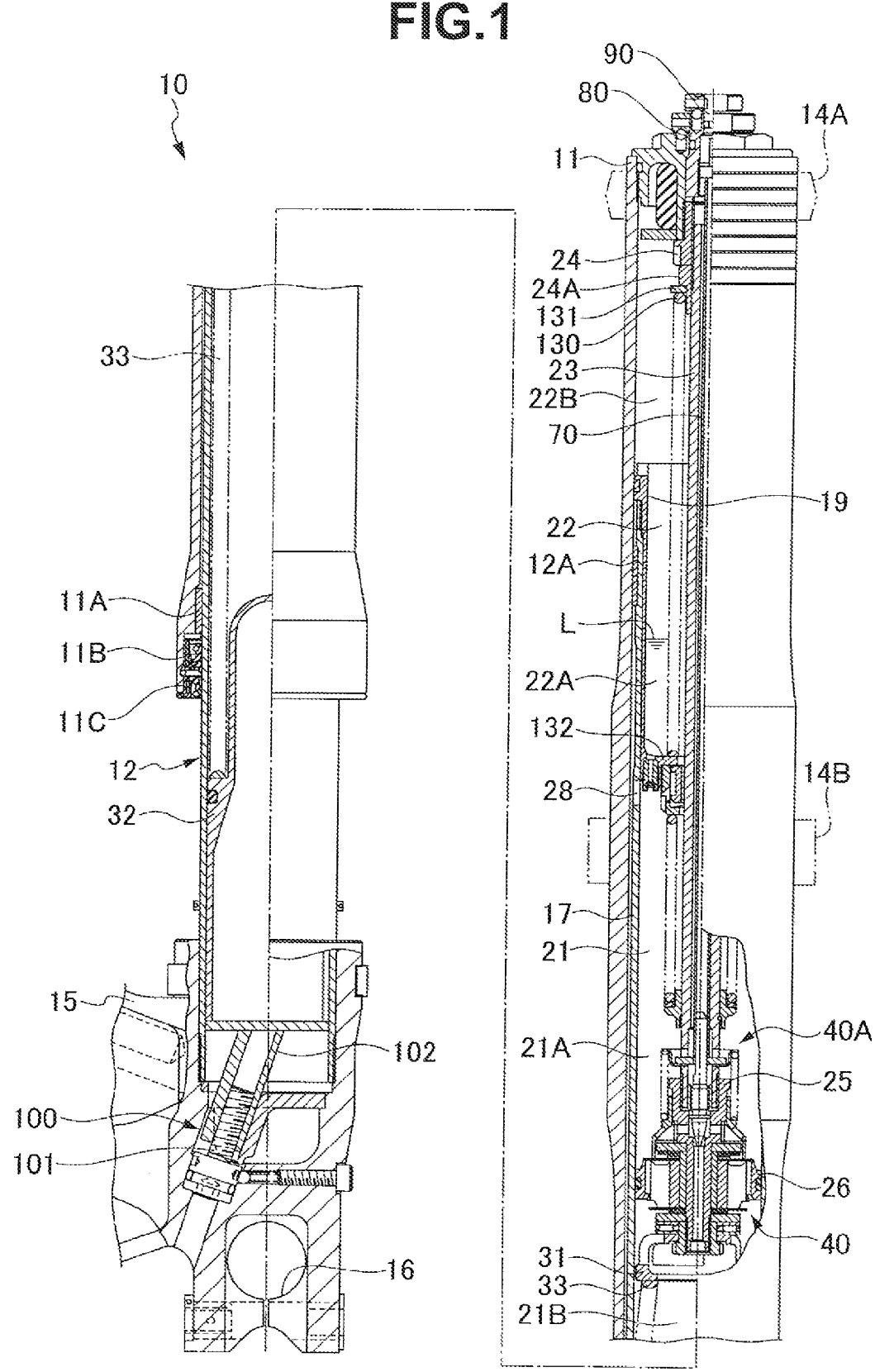
FIG. 1 is a cross sectional view showing a hydraulic shock absorber.

A front fork, which may be a hydraulic shock absorber, 10 is constituted by an inverted type front fork in which an outer tube 11 is arranged in a vehicle body side, and an inner tube 12 is arranged in a wheel side, and is structured, as shown in FIGS. 1 to 4. The inner tube 12 is slidably inserted to an inner portion of the outer tube 11 via a guide bush 11A fixed to an inner periphery of a lower end opening portion of the outer tube 11. A guide bush 12A is fixed to an outer periphery of an upper end opening portion of the inner tube 12. Reference numeral 11B denotes an oil seal, and reference numeral 11C denotes a dust seal. A cap 13 is screwed to the upper end opening portion of the outer tube 11 in a liquid tight manner. Vehicle body side mounting members 14A and 14B are provided in an outer periphery of the outer tube 11. An axle bracket 15 is inserted and attached to the lower end opening portion of the inner tube 12 in a liquid tight manner so as to construct a bottom portion of the inner tube 12, and an axle mounting hole 16 is provided in the axle bracket 15.

The front fork 10 is provided with an annular oil chamber 17 comparted by an inner periphery of the outer tube 11, an outer periphery of the inner tube 12, and two guide bushes 11A and 12A mentioned above.

The front fork 10 is provided with a closed-end cup-shaped partition wall member 19 in a liquid tight manner in an upper end side inner periphery of the inner tube 12 via an O-ring or the like, that comparts a working fluid chamber 21 under a rod guide portion 19A in a bottom portion of the partition wall member 19, and comparts an oil reservoir chamber 22 over an upper portion of the rod guide portion 19A. A lower region in the oil reservoir chamber 22 corresponds to an oil chamber 22A, and an tipper region corresponds to an air chamber 22B. A guide bush 12A provided in an outer periphery of an upper end portion protruding from the inner tube 12 of the partition wall member 19 comes into slidable contact with an inner periphery of the outer tube 11.

The front fork 10 is structured such that a piston rod 23 attached to the outer tube 11 is slidably inserted to the rod guide portion 19A of the partition wall member 19. Specifically, a hollow piston rod 23 is screwed to a mounting collar 24 screwed to a lower end portion of a center portion of the cap 13, and is fixed by a lock nut 24A.

The front fork 10 is structured such that a piston 26 brought into slidable contact with an inner periphery of the inner tube 12 is fixed to a piston bolt 25 screwed to a leading end portion of the piston rod 23 inserted to the inner tube 12 from the rod guide portion 19A of the partition wall member 19, and the oil chamber 21 is comparted into a piston rod side oil chamber 21A in which the piston rod 23 is accommodated, and a piston side oil chamber 21B in winch the piston rod 23 is not accommodated. The piston 26 is fixed by a piston nut 27.

The front fork 10 always communicates the annular oil chamber 17 with the piston rod side oil chamber 21A via an oil hole 28 provided in the inner tube 12.

The front fork 10 is structured such that an upper spring bearing 31 is attached to a side of a lower end surface facing to the piston side oil chamber 21B of the piston 26 as mentioned below, a lower spring bearing 32 is arranged in a bottom portion of the inner tube 12 formed by the axle bracket 15, and a main suspension spring 33 is interposed between the upper spring bearing 31 and the lower spring bearing 32. The entire main suspension spring 33 is wetted by oil within the piston side oil chamber 21B. The front fork 10 absorbs an impact force applied from a road surface when a vehicle travels on the basis of an extending and contracting oscillation of the main suspension spring 33 and sub suspension spring 130 mentioned below. At this time, a spring load adjusting apparatus 100 mentioned below moves the lower spring bearing 32 upward and downward so as to freely adjust a spring load of the suspension spring 33.

Figure 3:
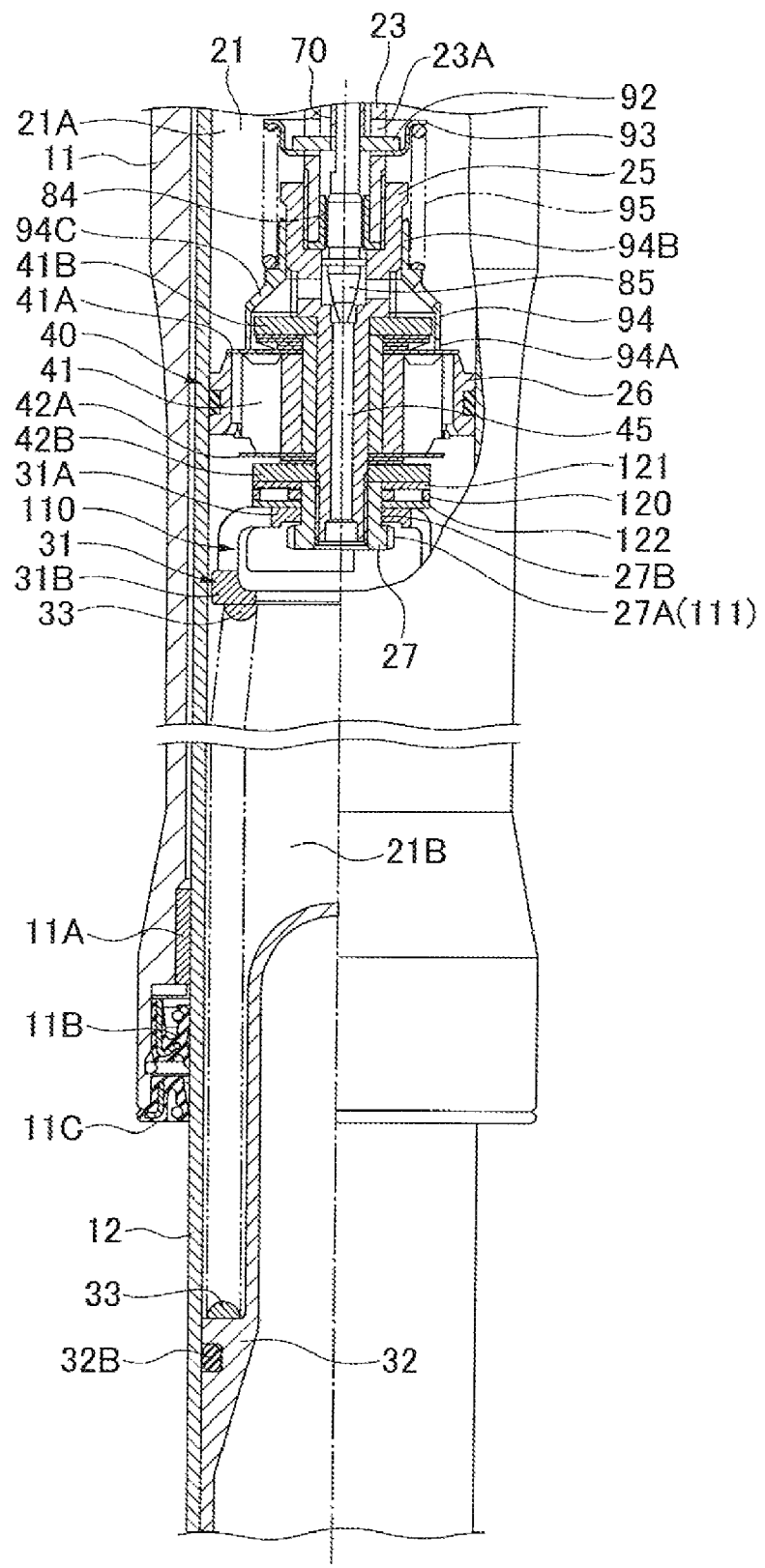
FIG. 3 is a cross sectional view of an internal portion in FIG. 1.
Figure 4:
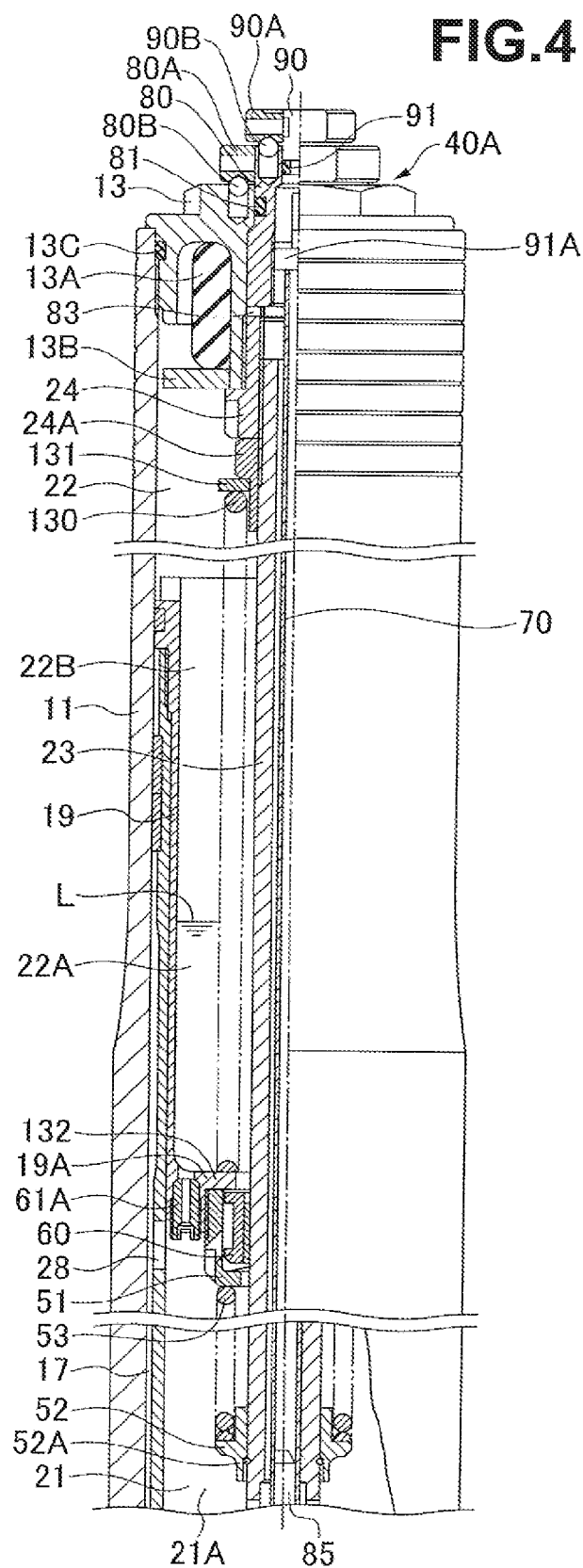
FIG. 4 is a cross sectional view of an upper portion in FIG. 1.

The front fork 10 is provided with a damping force generating apparatus 40 in the piston 26 (FIGS. 3 and 4).

The damping force generating apparatus 40 is provided with a compression side flow path 41 and an extension side flow path (not shown). The compression side flow path 41 is opened and closed by a compression side disc valve 41A (a compression side damping valve) backed up to a valve stopper 41B. The extension side flow path is opened and closed by an extension side disc valve 42A (an extension side damping valve) backed up to a valve stopper 42B. In this case, the valve stopper 41B, the valve 41A, the piston 26, the valve 42A and the valve stopper 42B construct a valve assembly attached to a piston bolt 25, and is pinched by a piston nut 27 screwed to the piston bolt 25.

The damping force generating apparatus 40 is structured such that a damping force adjusting apparatus 40A mentioned in detail below is provided in a center portion of the cap 13, a needle valve 85 of the damping force adjusting apparatus 40A is inserted to a hollow portion of the piston rod 23, and an opening degree of a bypass path 45 provided in the piston rod 23 is adjusted by an upward and downward movement of the needle valve 85. The bypass path 45 bypasses the piston 26, and communicates the piston rod side oil chamber 21A with the piston side oil chamber 21B.

The damping force generating apparatus 40 generates a compression side damping force in a low speed range in a compression side stroke on the basis of a passage resistance of the bypass path 45 an opening degree of which is regulated by the needle valve 85, and generates a compression side damping force in high and middle speed ranges on the basis of a deflection deformation of the compression side disc valve 41A. Further, it generates an extension side damping force in a low speed range in an extension side stroke on the basis of a passage resistance of the bypass path 45 an opening degree of which is regulated by the needle valve 85, and generates an extension side damping force in middle and high speed ranges on the basis of a deflection deformation of the extension side disc valve 42A. The extending and contracting oscillation of the suspension spring 33 mentioned above is controlled by the compression side damping force and the extension side damping force.

The front fork 10 is structured such that a stopper rubber 13A and a stopper plate 13B with which an upper end portion of the partition wall member 19 provided in the inner tube 12 collides at a maximum compression stroke are firmly fixed to a lower end surface of the cap 13, and the maximum compression stroke is controlled by the stopper rubber 13A.

The front fork 10 is structured such that a rebound spring 53 is interposed between a spring sheet 51 threadedly engaged to a lower end surface facing to the piston rod side oil chamber 21A of the partition wall member 19 in an upper end side of the inner tube 12, and a spring sheet 52 locked to a stopper ring 52A provided in the piston rod 23. The partition wall member 19 pressurizes the rebound spring 53 with respect to the spring sheet 52 at a time of a maximum extension of the front fork 10, thereby controlling the maximum extension stroke.

In this case, in the front fork 10, a cross sectional area S1 of the annular oil chamber 17 formed by an annular gap between the outer tube 11 and the inner tube 12 is formed larger than a cross sectional area (an area surrounded by an outer diameter) S2 of the piston rod 23 (S1>S2).

Further, the rod guide portion 19A of the partition wall member 19 and the spring sheet 51 are provided with a check valve 60 which allows an oil flow from the oil reservoir chamber 22 to the piston rod side oil chamber 21A in the compression side stroke and blocks the oil flow from the piston rod side oil chamber 21A to the oil reservoir chamber 22 in the extension side stroke.

Further, since the rod guide portion 19A of the partition wall member 19 is structured such that an oil seal is not sealed and attached to a periphery of the piston rod 23, a small flow path (an orifice) 61 (not shown) communicating the piston rod side oil chamber 21A with the oil reservoir chamber 22 is structured by a small gap which the bush pressure inserted to the inner periphery of the check valve 60 forms around the piston rod 23. The small flow gap 61 may be pierced in the rod guide portion 19A of the partition wall member 19, and may be constituted by an orifice means 64A communicating the piston rod side oil chamber 21A with the oil reservoir chamber 22.

An operation of the front fork 10 is as follows.

(Compression Side Stroke)

In the compression side stroke, a working fluid at an approaching volumetric capacity of the piston rod 23 going into the inner tube 12 in the compression side stroke is transferred to the annular oil chamber 17 from the oil chamber 21A in the inner periphery of the inner tube 12 via an oil hole 28 of the inner tube 12. At this time, since a volumetric capacity increase amount $\Delta S1$ (a supply amount) of the annular oil chamber 17 is larger than a volumetric capacity increase amount $\Delta S2$ of the piston rod 23, a shortfall ($\Delta S1 - \Delta S2$) in an oil necessary supply amount to the annular oil chamber 17 is supplied from the oil reservoir chamber 22 via the check valve 60.

In this compression side stroke, as mentioned above, the compression side damping force is generated in the low speed range on the basis of the passage resistance of the bypass path 45 the opening degree of which is adjusted by the needle valve 85, and generates the compression side damping force in the middle and high speed ranges on the basis of the deflection deformation of the compression side disc valve 41A.

(Extension Side Stroke)

In the extension side stroke, the working fluid at a retraction volumetric capacity amount of the piston rod 23 going out of the inner tube 12 in the extension side stroke is transferred to the oil chamber 21A in the inner periphery of the inner tube 12 from the annular oil chamber 17 via the oil hole 28 of the inner tube 12. At this time, since the volumetric capacity reduction amount. ΔS1 (a discharge amount) of the annular oil chamber 17 is larger than the volumetric capacity reduction amount ΔS2 of the piston rod 23, a surplus amount (ΔS1−ΔS2) in the discharge amount of the oil from the annular oil chamber 17 is discharged to the oil reservoir chamber 22 via the small flow path 61.

In this extension side stroke, as mentioned above, the extension side damping force is generated in the low speed range on the basis of the passage resistance of the bypass path 45 the opening degree of which is adjusted by the needle valve 85, and the extension side damping force is generated in the middle and high speed ranges on the basis of the deflection deformation of the extension side disc valve 42A. Further, the extension side damping force is also generated on the basis of the passage resistance of the small flow path 61 mentioned above.

A description will be given below of the damping force adjusting apparatus 40A.

The damping force adjusting apparatus 40A is structured, as shown in FIGS. 3 and 4, such that a hollow portion of the piston rod 23 is provided with only one push rod 70 having a non-circular cross section which is movable in a rotational direction and an axial direction, a D-shaped cross section in the present embodiment. A first adjusting portion 80 and a second adjusting portion 90 are coaxially arranged in an upper portion of the front fork 10 and on an extension of the bush rod 70. In this case, the first adjusting portion 80 moves the push rod 70 in the rotational direction, and the second adjusting portion 90 moves the push rod 70 in the axial direction. Further, the damping force adjusting apparatus 40A is structured such that the needle valve 85 slidably locking into the non-circular cross section of the push rod 70 is screwed with the hollow portion of the piston rod 23, the needle valve 85 is moved via a screwing motion on the basis of a rotation of the first adjusting portion 80. An opening degree of the bypass path 45 is adjusted by the needle valve 85, and the damping force on the basis of the passage resistance of the bypass path 45 can be adjusted by extension. Further, the damping force adjusting apparatus 40A energizes a compression side disc valve 41A in a closing direction of the compression side disc valve 41A, by a spring 95 which collides with the push rod 70 in the axial direction, and can adjust the compression side damping force on the basis of the deflection deformation of the compression side disc valve 41A. A description will be given below of structures of the first adjusting portion 80 and the second adjusting portion 90, a damping force adjusting structure using the needle valve 85, and a damping force adjusting structure using the spring 95.

(Structure of First Adjusting Portion 80 and Second Adjusting Portion 90) (FIGS. 3 and 4)

The cap 13 constituting a cap assembly is screwed to an upper end opening portion of the outer tube 11 in a liquid tight manner via an O-ring 13C. A mounting collar 24 is screwed to a lower end opening side of the cap 13, and an upper end portion of the piston rod 23 is screwed to the mounting collar 24 so as to be fixed by the lock nut 24A.

The first adjusting portion 80 is inserted and attached in a liquid tight manner from a lower end opening side of a center hole of the cap 13 via an O-ring 81. The first adjusting portion 80 is engaged with an intermediate step portion of the cap 13 in an axial direction so as to be prevented from coming off to an upper side, and comes into contact with an upper end surface of the mounting collar 24 screwed to the lower end opening side of the cap 13 in the axial direction to prevent it from coming off to a lower side. As a result, the first adjusting portion 80 is rotatably provided in the cap 13 by using an operation knob 80A in an outer periphery of an upper end. A lower end surface coming into contact with the mounting cover 24 of the first adjusting portion 80 is provided with a horizontal groove, and both side projections of an engagement piece 83 are engaged with the horizontal groove with approximately no play in the rotational direction. An outer periphery of the non-circular cross section (the D-shaped cross section) of the push rod 70 is passed through a non-circular hole (a D-shaped hole) provided in the center of the locking piece 83, is engaged in the rotational direction with approximately no play, and is slidable in the axial direction. Accordingly, the first adjusting portion 80 can move the push rod 70 in the rotational direction. Reference numeral 80B denotes a detent mechanism with respect to the operation knob 80A.

The second adjusting portion 90 is inserted and attached in a liquid tight manner from a lower end opening side of a center hole of the first adjusting portion 80 via an O-ring 91, and is engaged with an intermediate step portion of the first adjusting portion 80 in an axial direction so as to be prevented from coming off to an upper side. A pressing element 91A is engaged with a lower end portion of the second adjusting portion 90 in such a manner as to be engaged in the rotational direction and be slidable in the axial direction. A lower end surface of the pressing element 91A comes into contact with an upper end surface of the push rod 70 passing through the non-circular hole of the engagement piece 83 engaging with the side of the first adjusting portion 80 with no gap in the axial direction. In this case, the push rod 70 is energized upward by a spring force of a spring 95 mentioned later, and an upper end surface thereof always comes into contact with the lower end surface of the pressing element 91A of the second adjusting portion 90. The second adjusting portion 90 is moved by a screwing motion with respect to the first adjusting portion 80 by using the operation knob 90 in the upper end surface, and can move the push rod 70 in the axial direction. Reference numeral 90B denotes a detent mechanism with respect to the operation knob 90A.

(Damping Force Adjusting Structure Using Needle Valve 85) (FIG. 3)

An inner base 84 is inserted and attached to a lower end portion of the hollow portion of the piston rod 23, and a lower end surface of the piston rod 23 and an inner diameter step portion of the piston bolt 25 fixes a lower end flange of the inner base 84 in a pinching manner. The inner base 84 may be press-fit into the hollow portion of the piston rod 23. The needle valve 85 is inserted in a liquid tight manner to an inner periphery of the inner base 84 fixed to the piston rod 23 as mentioned above, and a thread portion of an intermediate portion of the needle valve 85 is screwed to the inner periphery of the piston bolt 25. The non-circular cross section of the upper end portion of the needle valve 85, the non-circular cross sectional portion formed in the D-shaped cross section in the present embodiment, is locked into the non-circular cross section in the lower end portion of the push rod 70 inserted to the hollow portion of the piston rod 23 with approximately no play, in such a manner as to be slidable in the axial direction and be engaged in the rotational direction.

If the first adjusting portion 80 moves the push rod 70 in the rotational direction as mentioned above, the needle valve 85 engaging with the push rod 70 in the rotational direction is moved by a screwing motion with respect to the piston bolt 25, and is moved forward and backward with respect to the valve sheet in the upper end portion of the vertical hole of the bypass path 45 provided in the piston bolt 25. The needle valve 85 adjusts the opening degree of the bypass path 45, and can adjust the damping force in the compression side and the extension side on the basis of the passage resistance of the bypass path 45 by extension.

In this case, when the first adjusting portion 80 moves, by a screwing motion, the needle valve 85 via the push rod 70, the needle valve 85 idle moves with respect to the center hole of the pressing piece 92 for the spring 95 mentioned later, and does not affect the spring 95.

(Damping Force Adjusting Structure Using Spring 95) (FIG. 3)

Long hole-shaped guide holes 23A extending in an axial direction are provided in both sides in a diametrical direction of the lower end side of the piston rod 23, and both side projections of the pressing piece 92 are locked into the guide holes 23A approximately with no play so as to be slidable in the axial direction. The lower end surface of the push rod 70 inserted to the hollow portion of the piston rod 23 comes into direct contact with the upper surface of the pressing piece 92. The non-circular cross sectional portion of the needle valve 85 locked into the lower end portion of the push rod 70 as mentioned above is loosely fitted to a circular hole provided in the center of the pressing piece 92 in such a manner as to be movable in the axial direction.

Around the lower end portion (the piston bolt 25) of the piston rod 23, there are arranged a spring bearing 93 which contacts both end projections of the pressing piece 92 from the lower side, and a valve presser foot 94 which collides with an upper surface (a back surface) of the compression side disc valve 41A, and the valve pressing spring 95 is interposed between the spring bearing 93 and the valve presser foot 94. The spring bearing 93 is formed in a cup shape, comes into contact with both side projections of the pressing piece 92 in the lower end of the inner periphery of the cup, and seats the spring 95 on the upper end outer peripheral flange of the cup. The valve presser foot 94 is provided with a circular ring-shaped pressing portion 94A which comes into contact with an appropriate outer diameter position on the upper surface of the compression side disc valve 41A circumferentially continuously (or intermittently). A slide portion 94B is slidably guided to the upper end outer periphery of the piston bolt 25, and an oil path 94C communicates the piston rod side oil chamber 21A with the compression side flow path 41, the extension side flow path, and the bypass path 45, and seats the spring 95 on an outer peripheral step portion.

If the second adjusting portion 90 moves the push rod 70 in the axial direction as mentioned above, the pressing piece 92 with which the lower end surface of the push rod 70 contacts moves the spring bearing 93 upward and downward so as to extend and compress the valve pressing spring 95, and adjusts a set load of the spring 95. Accordingly, the set load of the spring 95 energizes the compression side disc valve 41A in a direction of closing the compression side disc valve 41A via the valve presser foot 94, and it is possible to adjust the compression side damping force on the basis of the deflection deformation of the compression side disc valve 41A. The valve presser foot 94 can be replaced by a structure in which the diameter of the presser foot portion 94A is different. The valve presser foot 94 provided with the large-diameter presser foot portion 94A presses the outer peripheral side of the compression side disc valve 41A so as to enlarge the damping force from the low speed range of the piston speed. The valve presser foot 94 provided with the small-diameter presser foot portion 94A presses the inner peripheral side of the compression side disc valve 41A so as to enlarge the damping force in the middle to high speed range of the piston speed.

In this case, when the second adjusting portion 90 moves the pressing piece 92 via the push rod 70, the push rod 70 and the pressing piece 92 idle move in the axial direction with respect to the needle valve 85, and does not affect the needle valve 85.

Next, a description will be given of a spring load adjusting apparatus 100 adjusting the spring load of the suspension spring 33 by moving the lower spring bearing 32 upward and downward. In this case, the lower spring bearing 32 is formed in a closed-end tubular shape, has a bottom plate 32A contacting against, a lower end portion, and is inserted to an inner periphery of the inner tube 12 so as to be movable upward and downward via an O-ring 32B.

Figure 2:
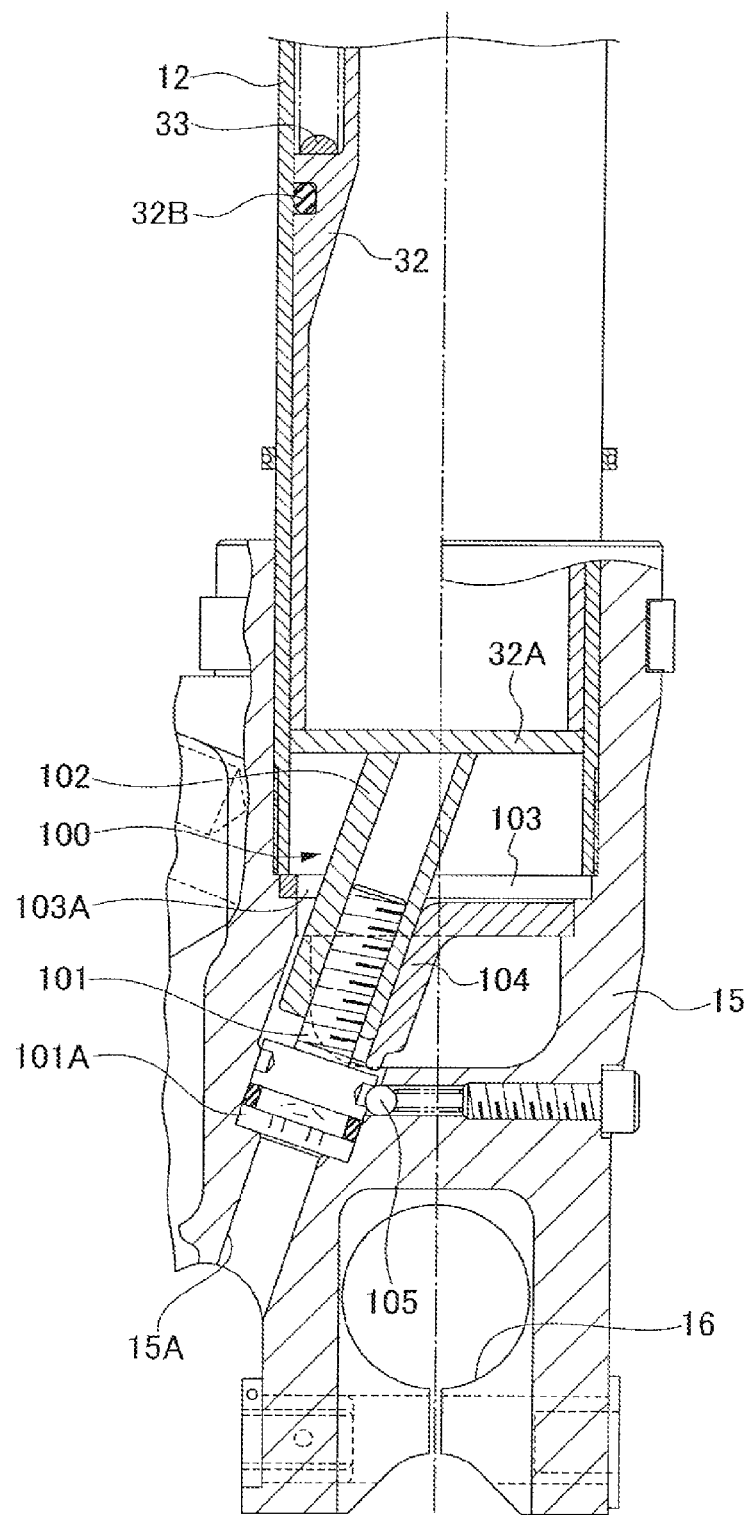
FIG. 2 is a cross sectional view of a lower portion in FIG. 1.

The spring load adjusting apparatus 100 supports the bottom plate 32A of the lower spring bearing 32 by an adjustment bolt 101 facing an external portion at a position deviated from, the axle mounting hole 16 of the axle bracket 15 constituting the bottom portion of the inner tube 12 (near a side of the axle mounting hole 16), as shown in FIG. 2, and moves the lower spring bearing 32 upward and downward in accordance with a screw motion of the adjustment bolt 101 so as to adjust the spring load of the suspension spring 33.

At this time, the adjustment bolt 101 is arranged obliquely with respect to a center axis passing through the axle mounting hole 16 of the inner tube 12, and supports the adjust bolt 101 in the inner surface of the bottom portion of the inner tube 12 in a state of preventing the adjust bolt 101 from coming off to the external portion. An operation portion 101A of the adjust bolt 101 is faced to the external portion from an operating hole 15A of the axle bracket 15. Further, an adjustment nut 102 is screwed with a threaded portion of the adjustment bolt 101 facing the inner portion of the inner tube 12. The adjustment nut 102 is prevented from rotating by a rotation preventing means provided in the inner portion of the inner tube 12, and makes the bottom plate 32A of the lower spring bearing 32 come into contact with a leading end of the adjust nut 102. The rotation preventing means 103 is constituted by a washer pinched between the inner tube 12 and the axle bracket 15, and inserts a deformed portion of the adjust nut 102 to a rotation preventing deformed slit 103A provided in the washer. Further, a slider 104 is provided in a lower portion of the rotation preventing means 103 in the bottom portion of the inner tube 12. An outer surface of the adjustment nut 102 is slidably guided by the slider 104, and the adjustment bolt 101 can not be pressed from the external portion. Reference numeral 105 denotes a detent mechanism with respect to the adjustment bolt 101.

If the adjustment bolt 101 is moved by a screwing motion via the operation portion 101A by a tool inserted to the operating hole 15A of the axle bracket 15, the adjust nut 102 is moved upward and downward, and the lower spring bearing 32 (the bottom plate 32A) coming into contact with the adjust nut 102 is moved upward and downward. The lower spring bearing 32 adjusts an initial length of the suspension spring 33 with respect to the upper spring bearing 31 in the piston rod 23 side, and adjusts the spring load of the suspension spring 33.

A description will be given below of an upper spring bearing attaching structure 110 which can reduce the rotational friction which the upper and lower spring bearings 31 and 32 apply to the suspension spring 33 when the suspension spring 33 is extended and compressed.

The upper spring bearing attaching structure 110 attaches the upper spring bearing 31 to the leading end portion of the piston bolt 25 of the piston rod 23 corresponding to the piston support member, that is, the leading end portion of the piston bolt 25 closer to the suspension spring 33 than the piston 26, in such a manner as to be rotatable and also prevented from falling away, as shown in FIG. 3.

Specifically, at a time of setting the piston nut 27 fixing the piston 26, the disc valves 41A and 42A, and the valve stoppers 41B and 42B in the leading end portion of the piston bolt 25, as mentioned above, the structure is made such that the piston nut 27 has a tool engagement portion 27A and a small-diameter portion 27B having a smaller diameter than the tool engagement portion 27A formed in a step shape near the tool engagement portion 27A. An end surface of the small-diameter portion 27B of the piston nut 27 screwed to the piston bolt 25 is brought into contact with the valve stopper 42B. Further, the tool engagement portion 27A of the piston nut 27 is formed as an outer evagination portion 111, and the upper spring bearing 31, a bearing member 120 and upper and lower bearing races 121 and 122 are loaded to the small-diameter portion 27B.

The upper spring bearing 31 is formed as a perforated cage shape, is provided with an attaching seat 31A which is inserted into the small-diameter portion 27B of the piston nut 27, can be engaged with the tool engagement portion 27A (the outer peripheral evagination portion 111) and collides with the lower bearing race 122, in a center portion of a cage bottom portion, and is provided with an annular spring bearing seat 31B in a cage opening portion. Reference symbol 31C denotes a flow path.

The bearing member 120 holds a roller in each of a plurality of holding grooves which are provided side by side in a peripheral direction of a perforated disc-shaped holder attached to the small-diameter portion 27B of the piston nut 27. The bearing races 121 and 122 are formed in a perforated disc shape attached to the small-diameter portion 27B of the piston nut 27.

Accordingly, the upper spring bearing attaching structure 110 is assembled by screwing the piston nut 27 on which is already installed the bearing member 120 and the bearing races 121 and 122 to the small-diameter portion 27B to the piston bolt 25, when constructing the valve assembly mentioned above by inserting and attaching the piston 26, the disc valves 41A and 42A and the valve stoppers 41B and 42B to the piston bolt 25. Accordingly, the upper spring bearing 31 is rotatably provided in the small-diameter portion 27B formed in the step shape in the valve stopper 42B side with respect to the outer peripheral evagination portion 111 (the tool engagement portion 27A) of the piston nut 27. The upper spring bearing 31 is prevented from coming off from the outer peripheral evagination portion 111 of the piston nut 27, and the upper spring bearing 31 interposes the bearing member 120, and the bearing races 121 and 122 with respect to the valve stopper 42B. When the upper spring bearing 31 supports the suspension spring 33 with respect to the lower spring bearing 32, the upper spring bearing 31 becomes rotatable via a small gap with respect to an end surface of the outer peripheral evagination portion 111 (the tool engagement portion 27A) of the piston nut 27.

Accordingly, in the front fork 10, as shown in FIGS. 1 and 4, the sub suspension spring 130 is interposed between the upper spring bearing 131 in the upper end portion side of the outer tube 11 and the lower spring bearing 132 in the partition wall member 19 side provided in the inner periphery of the inner tube 12, within the oil reservoir chamber 22 of the inner tube 12. A part of the other end side of the sub suspension spring 130 is wetted in the oil chamber 22A of the oil reservoir chamber 22 in which the oil surface L is maintained at the intermediate level within the cup of the partition wall member 19. The upper spring bearing 131 is constituted by an annular plate inserted and attached to an outer peripheral step portion of the lock nut 24A for the attaching collar 24 with which the piston rod 23 is engaged. The lower spring bearing 132 is formed by an upper surface facing to the oil reservoir chamber 22 of the rod guide portion 19A of the partition wall member 19.

An upper end portion of the main suspension spring 33 mentioned above is supported to the outer tube 11 via the piston rod 23, the piston 26 and the upper spring bearing 31, and a lower end portion thereof is supported to the inner tube 12 via the lower spring bearing 32. An upper end portion of the sub suspension spring 130 is supported to the outer tube 11 via the upper spring bearing 131, and a lower end portion is supported to the inner tube 12 via the lower spring bearing 132 of the partition wall member 19. Accordingly, if the outer tube 11 and the inner tube 12 are expanded or contracted at a certain length x, the main suspension spring 33 and the sub suspension spring 130 are expanded or contracted at the same length x, respectively. In other words, the main suspension spring 33 and the sub suspension spring 130 are arranged in parallel to each other, and a total spring constant of the front fork 10 (a combined spring constant of the main suspension spring 33 and the sub suspension spring 130) K is obtained by a sum of a spring constant Km of the main suspension spring 33 and a spring constant Ks of the sub suspension spring 130. Accordingly, in the present embodiment, the spring constant Km of the main suspension spring 33 is set to a lower limit in an upper and lower limit range of the spring constant K required for the front fork 10. The spring constant Ks of the sub suspension spring 130 is set to a difference between a spring constant K (Km+Ks) to be set in the front fork 10 and the spring constant Km of the main suspension spring 33.

In the front fork 10, at a time of setting and changing the total spring constant, the main suspension spring 33 is not replaced but is kept assembled between the upper spring beating 31 and the lower spring bearing 32 within the piston side oil chamber 21B, and only the sub suspension spring 130 is replaced. If the cap 13 is detached from the outer tube 11, and the piston rod 23 is detached from the attaching collar 24 and the lock nut 24A existing together with the damping force adjusting apparatus 40A within the cap 13, it is possible to easily attach and detach the new and old sub suspension springs 130 to and from the upper end portion of the piston rod 23.

In accordance with the present embodiment, the following operations and effects can be achieved.

(a) Each of the main suspension spring 33 and the sub suspension spring 130 is interposed between the outer tube 11 side and the inner tube 12 side, and is arranged in parallel to each other. Accordingly, the main suspension spring 33 is set to the spring constant Km corresponding to the lower limit in the upper and lower limit range of the spring constant required for the front fork 10, and is kept being assembled at a time of replacing the spring. The sub suspension spring 130 is set to the small spring constant Ks corresponding to the difference between the total spring constant (the combined spring constant) (Km+Ks) to be set in the front fork 10 and the spring constant Km of the main suspension spring 33, and plural kinds of sub suspension springs having the different spring constants Ks can be previously prepared for setting and changing the spring constant of the front fork 10. Accordingly, the spring constant of the front fork 10 can be set and changed by replacing only the sub suspension spring 130.

(b) Since it is not necessary to detach the partition wall member in the upper end portion of the inner tube 12 for replacing the sub suspension spring 130, it is possible to reduce the man hours required to replace the spring in the front fork 10.

(c) Since the sub suspension spring 130 has the small spring constant, and it is possible to make the coil diameter and the wire diameter narrow and make the surface area small, the reduction of the oil amount of the oil reservoir chamber 22 caused by the replacement of the spring of the front fork 10 can be disregarded.

(d) The main suspension spring 33 within the working fluid chamber 21 is not replaced at a time of replacing the spring of the front fork 10. Accordingly, the oil flow path flowing through the space between coils of the main suspension spring 33 is not changed in the inner portion of the working fluid chamber 21, it is possible to suppress the change of the damping force characteristic.

(e) The main suspension spring 33 is designed so as to have an efficient spring constant (critical design), on a stress by selecting a standard coil diameter of the wire material, and the difference from the total spring constant of the front fork 10 can be borne by the sub suspension spring 130. Accordingly, it is possible to achieve a weight saving without unnecessarily making the wire diameter of the main suspension spring 33 thick (excess design).

(f) Since the sub suspension spring 130 has the small spring constant, and the wire diameter thereof can be made narrow, it is possible to use the wire material having a higher tensile strength even in the same material (for example, JISG3522), and it is possible to reduce a weight per unit strength.

(g) Even in the specification that the allowable stress of the spring, the closed height and the like are hard to be designed by only one spring, it, is possible to easily establish the specification by two springs comprising the main suspension spring 33 and the sub suspension spring 130.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit, and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A hydraulic shock absorber in which an inner tube in an axle side is slidably inserted into an outer tube in a vehicle body side, comprising:
    a partition wall member is provided in an inner periphery of the inner tube, a working fluid chamber is comparted in a lower portion of the partition wall member, an oil reservoir chamber is comparted in an upper portion,
    a piston support member attached to the outer tube side is inserted into the working fluid chamber through the partition wall member, and a piston sliding within the working fluid chamber is provided in a leading end portion of the piston support member,
    wherein a main suspension spring is interposed between an upper spring bearing in the piston support member side attached to the outer tube side and a lower spring bearing in a bottom portion side of the inner tube, within the working fluid chamber of the inner tube,
    wherein a sub suspension spring is interposed between an upper spring bearing in an upper end portion side of the outer tube side and a lower spring bearing in the partition wall member provided in an inner periphery of the inner tube, within the oil reservoir chamber of the inner tube, and
    wherein a spring constant of the main suspension spring is set to a lower limit in an upper and lower limit range of a spring constant required for the hydraulic shock absorber.

2. A hydraulic shock absorber according to claim 1, wherein a spring constant of the sub suspension spring is set to a difference between a spring constant to be set to the hydraulic shock absorber and a spring constant of the main suspension spring.

3. A hydraulic shock absorber according to claim 2, further comprising a spring load adjusting apparatus supporting a bottom plate of the lower spring bearing in the bottom portion side of the inner tube by an adjust bolt facing to an outer portion at a position deflecting from an axle attaching hole of an axle bracket constructing the bottom portion of the inner tube, and adjusting a spring load of the suspension spring by moving up and down the lower spring bearing on the basis of a peristaltic movement of the adjust bolt.

4. A hydraulic shock absorber according to claim 1, further comprising a spring load adjusting apparatus supporting a bottom plate of the lower spring bearing in the bottom portion side of the inner tube by an adjust bolt facing to an outer portion at a position deflecting from an axle attaching hole of an axle bracket constructing the bottom portion of the inner tube, and adjusting a spring load of the suspension spring by moving up and down the lower spring bearing on the basis of a peristaltic movement of the adjust bolt.

* * * * *